US010601803B2

(12) United States Patent
Kowshik et al.

(10) Patent No.: US 10,601,803 B2
(45) Date of Patent: Mar. 24, 2020

(54) TRACKING USER ACTIVITY FOR DIGITAL CONTENT (71) Applicant: Amazon Technologies, Inc., Reno, NV (US)

(72) Inventors: Hemant Jagadish Kowshik, Karnataka (IN); Ashwin Devendrappa Tengli, Karnataka (IN)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 292 days.

(21) Appl. No.: 15/829,119

(22) Filed: Dec. 1, 2017

(65) Prior Publication Data

US 2018/0097792 A1 Apr. 5, 2018

Related U.S. Application Data (63) Continuation of application No. 14/840,899, filed on Aug. 31, 2015, now Pat. No. 9,882,886.

(51) Int. Cl.
*H04L 29/06* (2006.01)
*H04L 29/08* (2006.01)
*G06Q 30/02* (2012.01)

(52) U.S. Cl.
CPC ......... *H04L 63/08* (2013.01); *G06Q 30/0246* (2013.01); *H04L 63/1408* (2013.01); *H04L 63/1466* (2013.01); *H04L 67/22* (2013.01)

(58) Field of Classification Search
CPC . H04L 63/08; H04L 63/1408; H04L 63/1466; H04L 67/22; G06Q 30/0246
See application file for complete search history.

(56) References Cited

U.S. PATENT DOCUMENTS 8,886,575 B1* 11/2014 Liu .................... G06Q 30/0201
706/12
2008/0201214 A1* 8/2008 Aaron .................... G06Q 30/02
705/14.47

(Continued)

OTHER PUBLICATIONS

Leung, Depress phishing by CAPTCHA with OTP, IEEE, 2009 3rd International Conference on Anti-counterfeiting, Security, and Identification in Communication, Aug. 20-22, 2009, IEEE Xplore, Oct. 6, 2009 (Year: 2009).*

(Continued)

*Primary Examiner* — Luu T Pham
*Assistant Examiner* — Harvey I Cohen
(74) *Attorney, Agent, or Firm* — Hogan Lovells US LLP (57) ABSTRACT High conversion rate content can be displayed with primary content from one or more publishers in order to determine whether the content is being displayed to human users or provided to automated processes such as robots. Convertible content such as advertising will generally result in conversions or other actions within an expected range of occurrences. Convertible content performing significantly below the range can be indicative of robotic traffic. Such determinations can be difficult for publishers with low volume traffic, however, as there may not be sufficient data to make an accurate determination. For such publishers, or users viewing content for such publishers, high conversion rate content can be displayed that will allow such determinations to be made with fewer data points. The rates can be used to determine robotic users, which can be blocked, as well as to determine poorly performing placements of the content by the publishers.

20 Claims, 7 Drawing Sheets

(56) References Cited

U.S. PATENT DOCUMENTS

| | | | |
|---|---|---|---|
| 2008/0270154 A1* | 10/2008 | Klots | G06Q 30/02 705/14.4 |
| 2008/0281606 A1* | 11/2008 | Kitts | G06Q 30/02 705/1.1 |
| 2009/0099904 A1 | 4/2009 | Affeld | |
| 2009/0164269 A1* | 6/2009 | Gupta | G06F 21/552 705/14.47 |
| 2010/0306161 A1* | 12/2010 | Chen | G06N 7/005 706/52 |
| 2011/0314116 A1* | 12/2011 | Bayer | G06Q 30/0185 709/206 |
| 2012/0143861 A1 | 6/2012 | Sethi | |
| 2014/0068407 A1* | 3/2014 | Suh | G06Q 30/02 715/234 |
| 2015/0046254 A1 | 2/2015 | Raab | |
| 2015/0237115 A1* | 8/2015 | Kirillov | H04L 67/10 709/201 |
| 2015/0262226 A1* | 9/2015 | Howe | G06Q 30/0248 705/14.47 |
| 2016/0117726 A1* | 4/2016 | Lee | G06Q 30/0255 705/14.53 |

OTHER PUBLICATIONS

Kitts et al., Click fraud botnet detection by calculating mix adjusted traffic value: A method for de-cloaking click fraud attacks that is resistant to spoofing, IEEE, 2013 IEEE International Conference on Intelligence and Security Informatics, Jun. 4-7 2013 (Year: 2013).*

Kantardzic et al., Improving Click Fraud Detection by Real Time Data Fusion, 2008 IEEE International Symposium on Signal Processing and Information Technology, Dec. 16-19, 2008 (Year: 2008).*

Majumdar et al., Addressing Click Fraud in Content Delivery Systems, IEEE INFOCOM 2007—26th IEEE International Conference on Computer Communications, IEEE, May 6-12, 2007 (Year: 2007).*

Walgampaya et al., Cracking the Smart ClickBot, 2011 13th IEEE International Symposium on Web Systems Evolution (WSE), IEEE, Sep. 30-30, 2011 (Year: 2011).*

Non-Final Rejection issued in U.S. Appl. No. 14/840,899, dated Dec. 22, 2016.

Notice of Allowance issued in U.S. Appl. No. 14/840,899, dated Dec. 22, 2016.

Oikonomou et al., Modeling Human Behavior for Defense Against Flash-Crowd Attacks, IEEE, Communications, 2009. ICC '09. IEEE International Conference on, Aug. 2009.

Gu et al., Active Botnet Probing to Identify Obscure Command and Control Channels, IEEE, Computer Security Applications Conference, 2009. ACSAC '09. Annual, Dec. 2009.

Rui et al., ExcuseMeButAreYouHuman, ACM, Nov. 2003 Multimedia '03: Proceedings of the eleventh ACM international conference on Multimedia, Nov. 2003.

Kang et al., Large-scale bot detection for search engines, ACM, Apr. 2010 WWW '10: Proceedings of the 19th international conference on World wide web, Apr. 2010.

* cited by examiner

TRACKING USER ACTIVITY FOR DIGITAL CONTENT

CROSS REFERENCE TO RELATED APPLICATIONS

This application is a Continuation of allowed U.S. patent application Ser. No. 14/840,899, filed Aug. 31, 2015, entitled "TRACKING USER ACTIVITY FOR DIGITAL CONTENT," which is incorporated herein by reference for all purposes.

BACKGROUND

As the number of users viewing information and purchasing items electronically increases, there is a corresponding increase in the amount of revenue spent in electronic environments. In some cases, content is targeted to specific users or to specific web pages or other interfaces. In many instances, the provider of the content (such as a webpage or mobile application) will receive some compensation, where the amount of the compensation is related to the amount of users viewing or otherwise interacting with the content. A provider who wants to increase revenue will sometimes perform actions that fraudulently or at least impermissibly increases the amount of compensation to be received based on traffic that appears to be associated with unique users, but instead is the result of automated processes that replicate such traffic. In many instances, it can be difficult to distinguish between legitimate traffic and traffic that is automatically generated for the purpose of increasing revenue.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure may overcome one or more of the aforementioned and other deficiencies experienced in conventional approaches to providing electronic content in a networked environment. In particular, various embodiments provide mechanisms for determining whether network traffic corresponds to human users or automated processes, often referred to as robots or "bots," which can enable the automated processes to be blocked, improving network performance and ensuring that user traffic and views of specific content such as advertising is tracked accurately. Such an approach also can help to detect publishers of content who are using automated processes to increase the traffic numbers for their content, which in some cases can result in an improper amount of compensation being provided to the publisher. Remedial actions for the publishers can be taken, such as to withhold compensation or block further publishing of content associated with the publisher, among other such actions.

Content such as advertising is often monitored for purposes of performance and compensating the publisher providing such content. In the case of advertising, an ad will typically result in a user either not viewing the ad, viewing the ad (resulting in a view or an impression in some embodiments), clicking on the ad (resulting in a "click"), or consuming content, a service, or an item related to the ad (resulting in a conversion). Publishers are often compensated for including advertising with their content, where the compensation is based upon factors such as the number of ad impressions, clicks, and/or conversions. For this reason, some publishers are motivated to utilize automated processes to improperly increase the apparently legitimate traffic to the content, which can increase the determined number of views or clicks, for example, thereby increasing the compensation due to the publisher. At least because this fraudulent network traffic consumes additional resources and costs the advertising entities money for ads that are never seen by a human user, it is desirable to detect and block this traffic.

As mentioned, it can be difficult to distinguish an individual request received from a human user from a request received from an automated process. Because converting content such as ads generally perform within a certain performance range, such as a range of percentages of conversions when displayed to human users, one metric for determining the presence of robotic traffic is to analyze the performance of ads displayed with content from a particular publisher, or ads displayed to a particular user or group of users, to determine whether the performance is significantly outside the expected range. For example, if an ad generally converts 1% of the time, with a range of 0.5% to 1.5%, a performance of an order of magnitude less, such as a rate less than 0.05%, may be indicative of robotic traffic that is causing the content to be displayed, and potentially simulating a click, but not providing any value and unnecessarily utilizing resources.

While such an approach is useful for high volume publishers with a lot of network traffic or usage data, it can be more difficult for publishers with few data points. For example, if a website gets only around one hundred hits over a period of time it can be difficult to determine with sufficient accuracy whether the ads re performing poorly, particularly when the conversion rate range is on the order of 1% or less. Further, some ad placements on a page or interface will perform better than others, with ads prominently placed at the top of a webpage typically performing better than ads placed elsewhere on the page, although typically only on the order of about three times better in some examples. Thus, publishers with a large number of low volume sites or robotic processes that spread hits across a large number of sites can often go undetected because there is not enough data for any of these sites, applications, or other such presentations of content. For applications, this can include a large number of emulators running the application in order to give the appearance of multiple devices running the application and receiving convertible content, such as new ads every few seconds.

Accordingly, approaches in accordance with various embodiments attempt to identify suspicious users, publishers, and/or user/publisher combinations based on factors such as ad performance. A number of instances of high conversion rate content, such as high conversion ads, can be presented in order to better determine whether traffic is human or robotic, as higher conversion rate content will require fewer data points for such a determination. It can be important to look at both users and publishers, as some publishers might use robotic processes to improve traffic but might still be within an expected range. In such cases it can be important to identify robotic users that may be fraudulently submitting requests to multiple sites associated with that publisher, etc. If the conversion rate or other metric is still unacceptably low for the high conversion rate ad, the user and/or publisher can be determined to be at least somewhat fraudulent and can be blocked in the system or otherwise managed accordingly.

Various other functions and advantages are described and suggested below as may be provided in accordance with the various embodiments.

For various types of electronic content, such as Web content or mobile application content, the obtaining, hosting, and/or providing of that content can be at least partially funded through the use of electronic content such as advertising that is placed in, or associated with, that content. The advertisements, or advertising, will often be associated with a party offering products or service for consumption (i.e., purchase, rent, lease, or download) by a user viewing the associated content. This advertising can be provided by the advertising party, a provider of the content, or a third party advertising service, among other such entities. The advertising in many instances will take the form of a banner ad or sponsored link, for example, although various other types of electronic advertising can be used as well within the scope of the various embodiments. As known in the art, "sponsored links" or "sponsored ads" are typically used with electronic interfaces or content such as Web sites, search engines, applications, mobile applications, online games, etc., wherein an advertiser provides a navigational element such as a hypertext link and associated text, graphics, and/or video to be displayed in the electronic interface, that enable a user to select or otherwise access the navigational element to be directed to a page or other location provided by the advertiser. The advertiser typically will pay a provider of the electronic interface and/or content (either directly or via the advertising service) based upon an aspect of each sponsored ad, such as the number of times users select the navigational element included therein or the number of times that an advertisement is displayed to users. Other factors can be considered as well, such as the number of conversions that resulted from displaying the ad, where a "conversion" can be defined as any obtaining or consuming (such as purchasing) of an object, service, or content associated with the advertising. Metrics such as the average number of clicks per view or average number of conversions per view can be used to determine performance of the advertising, or the placement of the advertising within the electronic interface, and a total number of views, clicks, conversions, and/or other such metrics can be used to determine the amount of compensation to the provider of the electronic interface. An advertiser might cause ads to be placed on multiple instances of electronic content from multiple providers, where each provider will receive an appropriate amount of compensation for providing the advertising. As known for electronic advertising, the ads displayed will generally not be fixed to the content but provided for certain users or views, or rotated with other content, among other such possibilities.

Figure 1A:
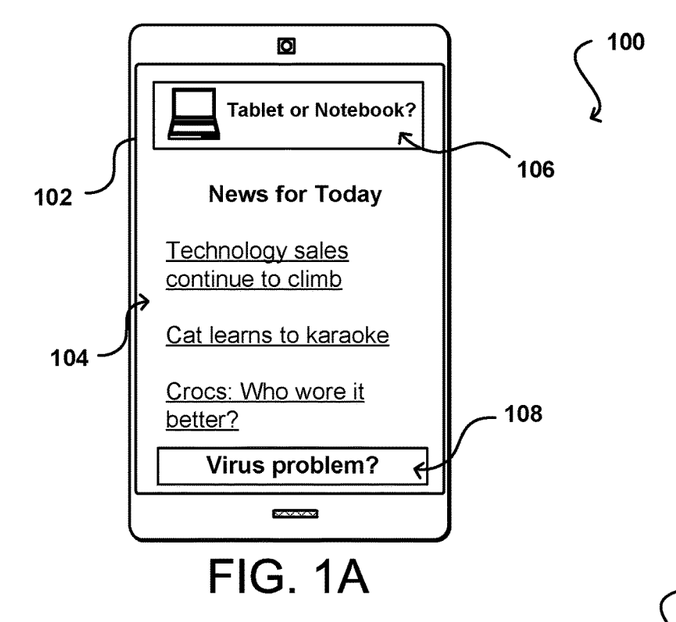
FIGS. 1A and 1B illustrate example displays of content that include advertising that can be utilized in accordance with various embodiments.

As an example, FIG. 1A illustrates an example state 100 of a computing device that can occur within the scope of the various embodiments. In this example, electronic content 104, such as hyperlinks to new articles, are displayed in a mobile application or mobile Web browser, for example, on a display screen 102 of the computing device. Although a portable computing device (e.g., a smartphone, an electronic book reader, or tablet computer) is shown, it should be understood that any device capable of receiving and processing input can be used in accordance with various embodiments discussed herein. These devices can include, for example, desktop computers, notebook computers, electronic book readers, personal data assistants, cellular phones, video gaming consoles or controllers, wearable computers (e.g., smart watches or glasses), television set top boxes, and portable media players, among others. In this example, the device has likely received navigation input from the user that caused the content 104 to be selected and displayed on the device. Along with the content, the interface displays a pair of ads 106, 108, in this case taking the form of graphics associated with sponsored links that a user can select to obtain additional information relating to the advertisement. For example, the upper advertisement 106 might be selected to cause an article about different types of computing devices to be displayed, while the lower advertisement 108 might be selected to cause information about various antivirus products to be displayed. Various other types of advertising and related content can be provided through such mechanisms as would be apparent to one of ordinary skill in the art in light of the teachings and suggestions contained herein.

Figure 1B:
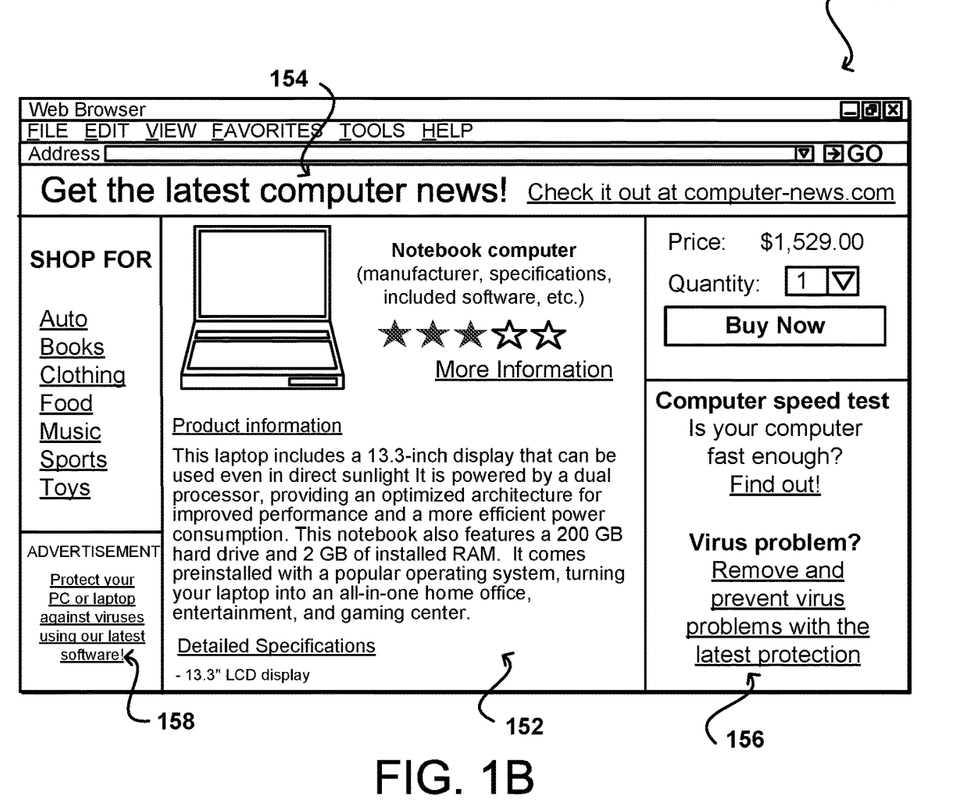

FIG. 1B illustrates another example interface 150 wherein advertising can be displayed with electronic content 152 within the scope of the various embodiments. In this example, a Web page is displayed in a Web browser on a computer such as a desktop computer. A main portion of the page includes primary content 152 provided by a content provider, typically associated with the URL or domain. A first advertisement 154 displayed with the content is a banner-type ad near the top of the page, which can correspond to a highly prominent placing for advertisements as the ad will almost always be displayed to users accessing this page of content. In this case, the advertisement is a sponsored link for a third party news vendor that will provide revenue for the site provider upon the user following the sponsored link. The page includes a second ad 158 which also in this case is a sponsored link, which directs the user to a third party software company. This ad is less prominently placed, such that the ad may not be displayed to, and/or viewed by, the majority of users accessing the page of content. It will still often be the case that the ad selected will relates to the item being viewed and thus can be somewhat likely to be of interest to the customer. The example webpage also includes a third area 156 for ads, which in this case is a list of advertisements provided by a third party upon the provider requesting ad content for a specific category, keyword, type of content, etc. Here, several ads might be displayed that relate to an aspect determined to be of likely interest to the customer. This group of ads takes up a significant amount of real estate on the page, but also includes a number of ads and thus increases the likelihood that the customer will follow one of the ads and generate ad-based revenue for the retailer. The amount of compensation for each placement, as well as the expected number of conversions for each placement, can vary accordingly.

As mentioned, the providing of electronic content such as electronic or "online" advertising is plagued by a significant percentage of automated or "robotic" traffic. Current estimates but the percentage of this automated traffic at between 30% and 40% of total network traffic. Since compensation is provided based at least in part upon the amount of traffic accessing an advertisement, this extra traffic can cause significant overpayment by the advertiser for views, clicks, or other actions that did not correspond to actual, unique human users. A significant challenge in the detection of such traffic or activity, however, resides in the fact that it is difficult to determine which traffic originated from a human user and which traffic originated from a robot or other automated process or component. Conventional pattern detection algorithms and approaches have not been able to obtain a straightforward method of detecting robot traffic. In practice, an advertiser or other such entity often resorts to detecting traffic patterns that correlate with very poor ad performance, and associating these low performing ad placements with robot traffic. For example, a user with a very high frequency of requests is likely to be robotic if the user displays very poor performance with respect to the average interaction with ads. For example, if an average user clicks on ads 1% to 3% of the time, and this user clicks on ads less than 0.01% of the time, then this order of magnitude difference may be sufficient for a provider to designate this user as a robot. Even if the provider is incorrect, this particular user may generate so little revenue that the provider may not care about inadvertently losing a few of these users if the process catches and stops many of the robots. Some providers, however, find it unacceptable, or at least undesirable, to block legitimate users, particularly where conversions may be infrequent for that user but highly lucrative.

Performance correlation-based techniques generally are only effective and/or accurate, however, if there is enough data (i.e., a sufficient number of ad click/conversion events) to confidently estimate various user-level performance metrics. For example, if a user only has a couple of data points over a long period, it will be tough to infer the frequency of conversion with any level of precision. Because it is difficult to detect robot traffic with such low activity, various robot providers cause a large number of robots to each perform a relatively low number of actions, such that none of the individual robots is likely to be detected but the overall effect in aggregate can still be sufficient. If typical display ad click rates are in the range of 0.3% for brand advertising and ~1% for retargeting, for example, an advertiser would need to serve each of these entities a large number of ad impressions (or views or displays of that advertising) before being able to determine a high-confidence estimate of performance. This is an expensive and error prone process which places inherent limits on the precision and recall of robot detection algorithms.

Accordingly, approaches in accordance with various embodiments attempt to determine suspicious users, publishers/providers, or other such entities and provide advertisements or other content that is associated with a high conversion rate among human users. For such high-conversion content, the descriptive or "creative" portion of the advertisement can indicate something that is highly likely to be of interest to a significant number of human users, such as to provide free items, large discounts, or other compensation for a user selecting the advertisements. In this way, the conversions for a user with even a relatively small number of impressions or views of the advertisement can be more accurately determined, as the ad will have a significantly high average conversion rate. While it might take at least 100 impressions to determine whether a user demonstrates an average conversion for a type of ad with a 1% conversion rate, it may take only three or four impressions to perform a similar calculation for a type of ad with a 30% conversion rate. Thus, the number of impressions needed to make such a determination can be significantly reduced. Further, since a high conversion rate ad will likely offer some type of compensation as attraction to the user, it can be beneficial that the expected conversion rate be relatively high such that a relatively few number of ads need to be displayed. There can be a trade-off and balancing point, however, as an ad for a $5 gift card might have approximately the same conversion rate as an ad for a $100 gift card, but the cost to the advertiser can be much higher, so it can be important to select an ad with the minimum cost to obtain a desired conversion rate. As discussed later herein, a score can be generated that is indicative of the number of impressions to expect for a given user, and the conversion rate needed to make a decision on that user may be determined at least in part using the expected and/or observed number of impressions over a period of time for that user.

Figure 2A:
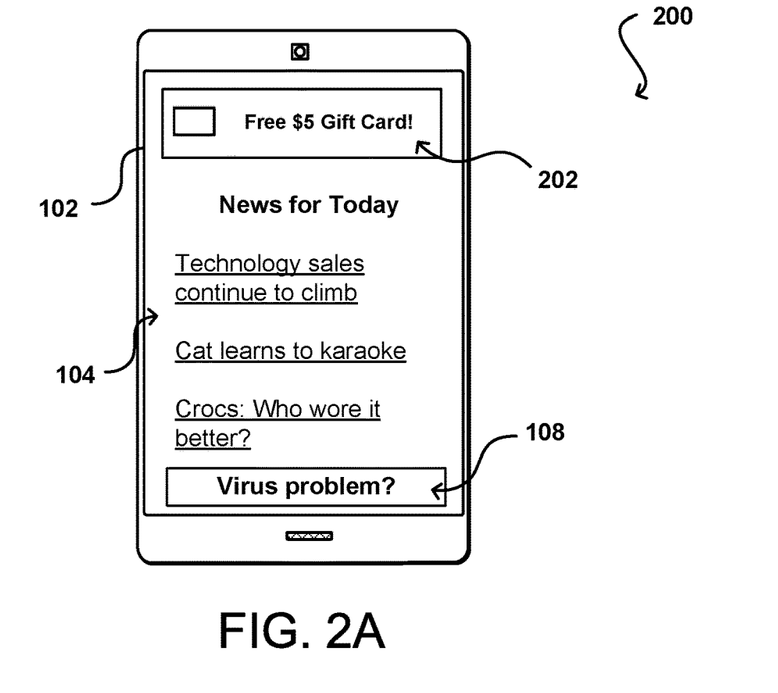
FIGS. 2A and 2B illustrate example displays of content that include high-conversion content and an authorization page corresponding to that content that can be utilized in accordance with various embodiments.

FIG. 2A illustrates an example situation 200 wherein high conversion rate content 202 is displayed with other electronic content 104 on a display screen 102 of a computing device. It should be understood that reference numbers may be carried over between figures for similar elements for purposes of simplicity of explanation, but such usage should not be interpreted as a limitation on the scope of the various embodiments unless otherwise explicitly stated. In this example, the high conversion rate content takes the form of a banner ad that offers a free $5 gift card for users who click on the advertisement. Due to the nature of the advertisement, as well as the prominent placement of the ad in a location that is likely associated with a relatively high conversion rate, it can be highly likely that the advertisement will be selected in order for the user to obtain the $5 gift card. It should be pointed out that the "creative" or graphics and wording of the advertisement should be such that the user understands that they will get a free gift card and also such that the user does not feel like there is some "catch" to getting the gift card, whereby the user may be less likely to select the advertisement.

Figure 2B:
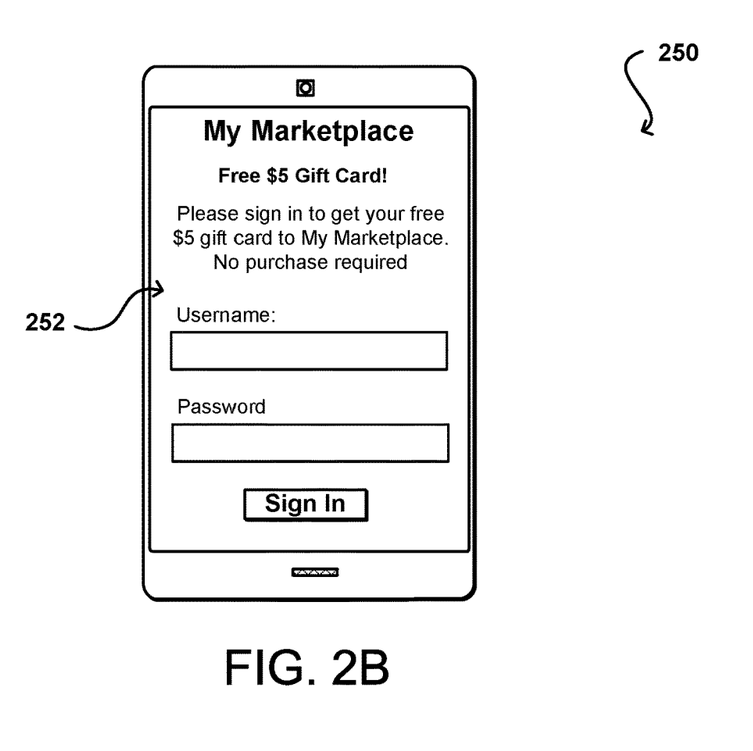

It should be pointed out, however, that providing high conversion rate content may be insufficient to distinguish between human and robotic users. For example, various robots are able to cause advertisements to be selected, or appear to have been selected, such that a "click" event can be simulated and/or triggered by a robotic process. Accordingly, an authentication aspect to the high conversion rate content can be advantageous in further distinguishing the type of user. For example, in FIG. 2B the gift card ad 202 was selected which caused a sign-in page 252 to be displayed for the authentication state 250 of the computing device. In this particular example a user is requested to enter username and password information, although various other types of user credentials can be provided within the scope of the various embodiments. Accurate credentials must be received in the appropriate locations in this embodiment, and there must be a unique account for the associated user with the appropriate entity (i.e., content provider or advertiser) in this example in order to obtain the $5 give card. In this case each user can obtain at most one such gift card, and each user account is separately validated and authorized to obtain such a gift card. The process then functions similar to a CAPTCHA test, wherein a user enters specific information in order to prove or verify that the user is a human. CAPTCHA-style tests have been relatively accurate in identifying robotic processes in various situations. A process that also functions as a CAPTCHA-style test can help to differentiate between human and robotic users. While human users are expected to click and convert at a high rate, robotic users may click but have no way of converting since they cannot verify their credentials. Further, such a test can help to differentiate between viewable ad placements and invisible or rarely viewable ad placements, as rarely viewable placements will generate poor conversion rates.

A CAPTCHA-style ad process can have other business-specific advantages as well. For example, such a process can help to identify the quality of the traffic being encountered, as users that are robotic can be identified with high confidence by citing their low conversion rate for high conversion rate content. For instance, a user who has been shown a few such ad impressions and has converted on none of those ads may be marked robotic. This can be contrasted with the conventional approach of showing a few thousand ad impressions and measuring their conversion rate before marking a user as robotic. Further, such a process can help to determine the quality of a specific publisher. By aggregating the conversion rate for high conversion rate content across all placements of the publisher, the overall quality of the publisher can be determined. For instance, a publisher with many invisible placements will have a poor conversion rate. From a statistical standpoint, a low confidence signal such as the regular ad conversion rate is being replaced with a high confidence signal, namely the conversion rate for the high conversion rate content. This comes at a cost though, in the form of the payout to be made to converting users. This cost can be limited by, for example, only targeting users where other robot detection flags are triggered, or publishers whose quality is suspect. Similarly, the cost can be limited by limiting the payout to one gift card per user at most, or using statistical techniques like importance sampling, among other such options.

Figure 3:
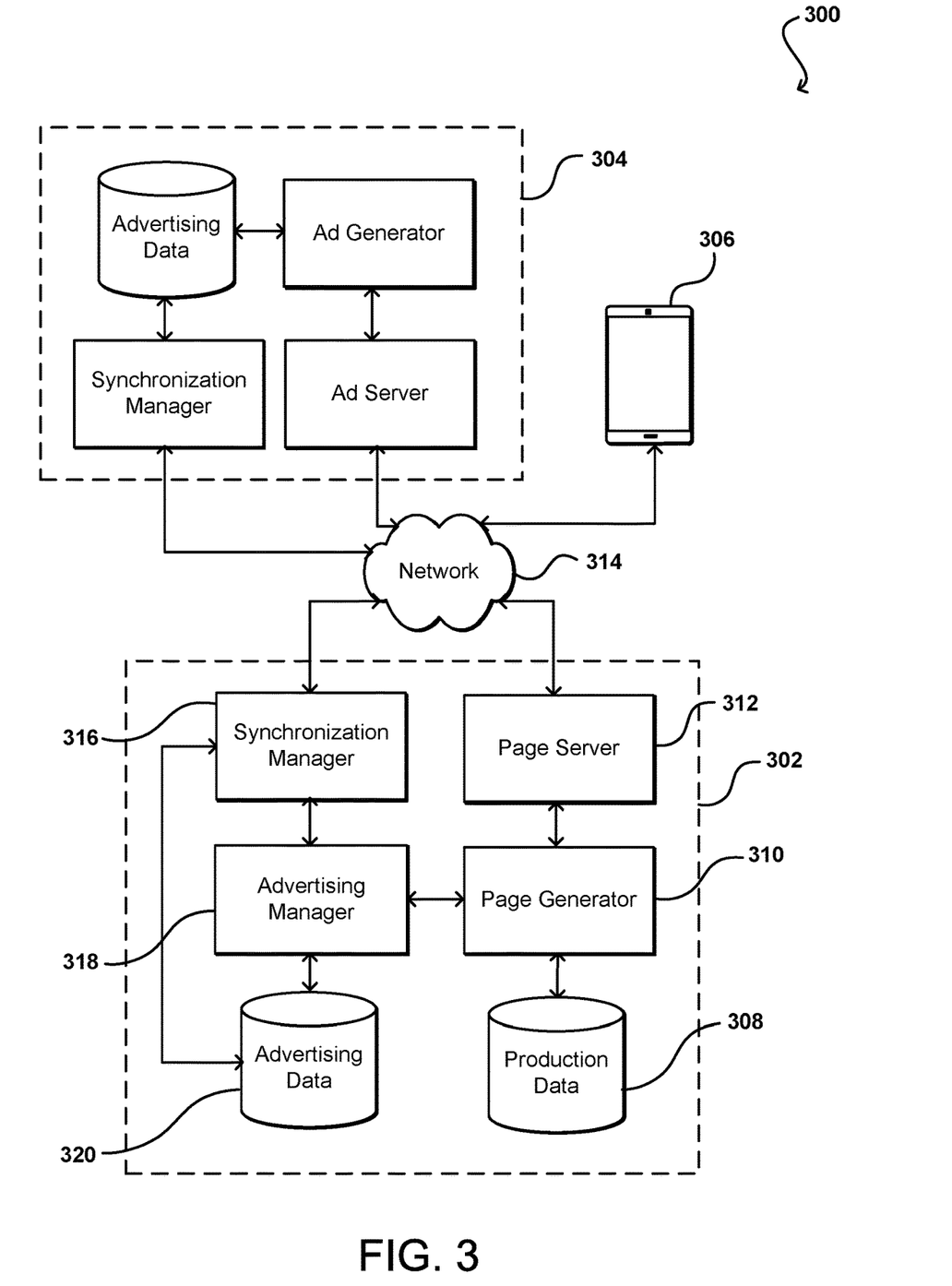
FIG. 3 illustrates an example system for providing advertising that can be utilized in accordance with various embodiments.

Because the high conversion rate content is relatively expensive for the advertiser or other entity attempting to validate human users, it can be beneficial in at least some embodiments to identify the users that are most likely to correspond to robots or other automated processes or components. Accordingly, components such as an activity tracker can observe user and traffic behavior in order to sparingly and selectively target certain users and publishers with suspicious activity whose quality is to be determined. In some embodiments the number selected can be based in part upon a current performance level of the system, where the number selected is intended to identify and block a sufficient amount of robotic traffic to return the system to performing within a target performance range or other such value. FIG. 3 illustrates an example environment 300 in which aspects of the various embodiments can be implemented. In this example, a content provider 302 can receive advertising information from at least one advertising entity 304. In certain embodiments, the advertising entity can be affiliated with, or part of, an electronic retailer providing an electronic marketplace, while in other embodiments the advertising entity can be a separate or third party provider. Components of the advertising entity 304 and the content provider 302 can each provide information useful for advertising, such as keyword-landing page pairs, creative elements, ad selection, and bid prices.

In this example, the content provider 302 generates and serves pages of content available to any appropriate end user 306, and thus can include components such as a production data store 308 that can be used by a page generator 310 to generate pages that can be served by a page server 312 (such as a Web server in a Web-based environment) or other content server over a network 314 to the end user 306. Similarly, another appropriate provider 304 can include components such as ad generator and ad server components for generating and serving advertisements to a user. While many of the embodiments are described with respect to a Web-based environment, it should be understood that pages are not limited to Web pages, but can include any application page or other interface page that can be displayed or otherwise conveyed to a user as discussed and suggested herein.

If the advertising entity 304 wishes to advertise with the provider 302 (or if the advertising from the advertising entity is determined to correspond to content from the provider using a third party advertising service, for example) using sponsored links or other advertisements that direct a user back to a page provided by the advertising entity, the advertising entity also can include components for determining the landing pages to be associated with the advertisements. While various advertising components in this example are shown to be part of the advertiser's system, it should be understood that these components can be part of a separate system or provided as a third party service, for example. In this example, the content provider system includes an advertising manager 318, which can encompass, monitor, and/or control a number of different algorithms and components for selecting and deciding upon pages on which to display ads, as well as dynamically determining when to show certain ads and selecting appropriate ads to show for each category, classes of users, specific items, etc. When the advertising manager 318 decides on an advertisement to be associated with content on the provider pages, the advertising manager 318 can store the advertising data to an advertising data store 320, which in some embodiments can comprise separate tables in the production data store 308. The advertising data store can include any information related to advertising, such as ad performance data, bid histories, bid amounts, categorizations, creative elements, etc. Portions of this data alternatively can be stored and/or accessed from other appropriate storage devices of the system and/or across the network. The content provider system also can include a synchronization manager 316 that can work with a synchronization component of the advertiser 304 to periodically synchronize the advertising data with the advertising data stored at the provider 302, such that the appropriate landing pages, creative content, and financial information can be designated and updated as desired. When a user 306 views a page of content served by the provider 302, the page can include an advertisement that can in some instances direct the user to a page of the advertising entity 304 upon selection by the user. In other cases, the user 306 can be directed to a page of content from the content provider 302 that relates to the advertisement. In still other cases, the content provider might credit the user or offer the user a promotion in exchange for watching the advertisement from the advertiser, which can relate to a product or service offered by the advertiser.

Figure 4:
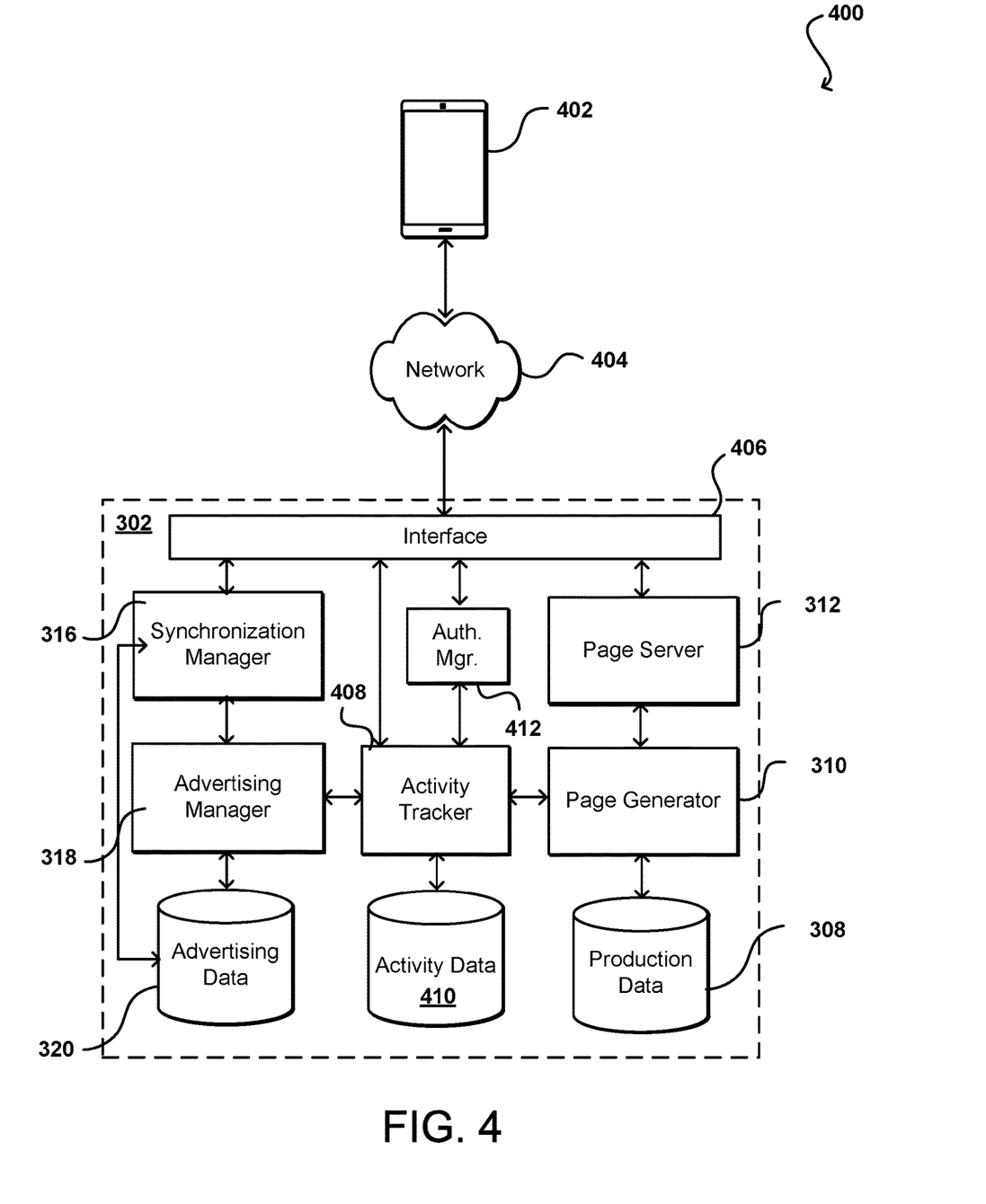
FIG. 4 illustrates another example system for monitoring user activity with respect to specific high conversion content that can be utilized in accordance with various embodiments.

In order to determine potentially suspicious users and/or publishers that are not performing to expectation, a component such as an activity tracker 408 can be used in such a system, as illustrated in the example environment 400 of FIG. 4. Here, the activity tracker can be a part of a content provider environment 302 that provides page (or application or other such) content to user devices 402 over at least one network 404 through an interface layer 406 of the environment. The activity tracker can work with components such as the page generator 310 and ad manager 318 to determine which ads and content are being displayed, as well as which ads and users are converting and other such information. The activity information in at least some embodiments can be stored to an activity data store 410 or other such repository. Having visibility into the pages served, the ads served, the conversions, and user activity can help the activity tracker to gather view, click, conversion, and other such data for users, ads, ad placements, publishers, and other such entities. As mentioned, the activity tracker can attempt to determine users whose conversion rates appear to be outside of the expected range(s), and work with the advertising manager 318 to serve ads or other high conversion rate content in an attempt to validate the user as a human or robot. The page generator 310 or other such component can pass along information as to whether the conversion for the user was successful, such as whether a sign in page was served and whether the user was sufficiently validated using an authentication manager 412 or other such component, which can compare received user credentials against user credentials stored by, or otherwise accessible to, the content provider environment 302.

Figure 5:
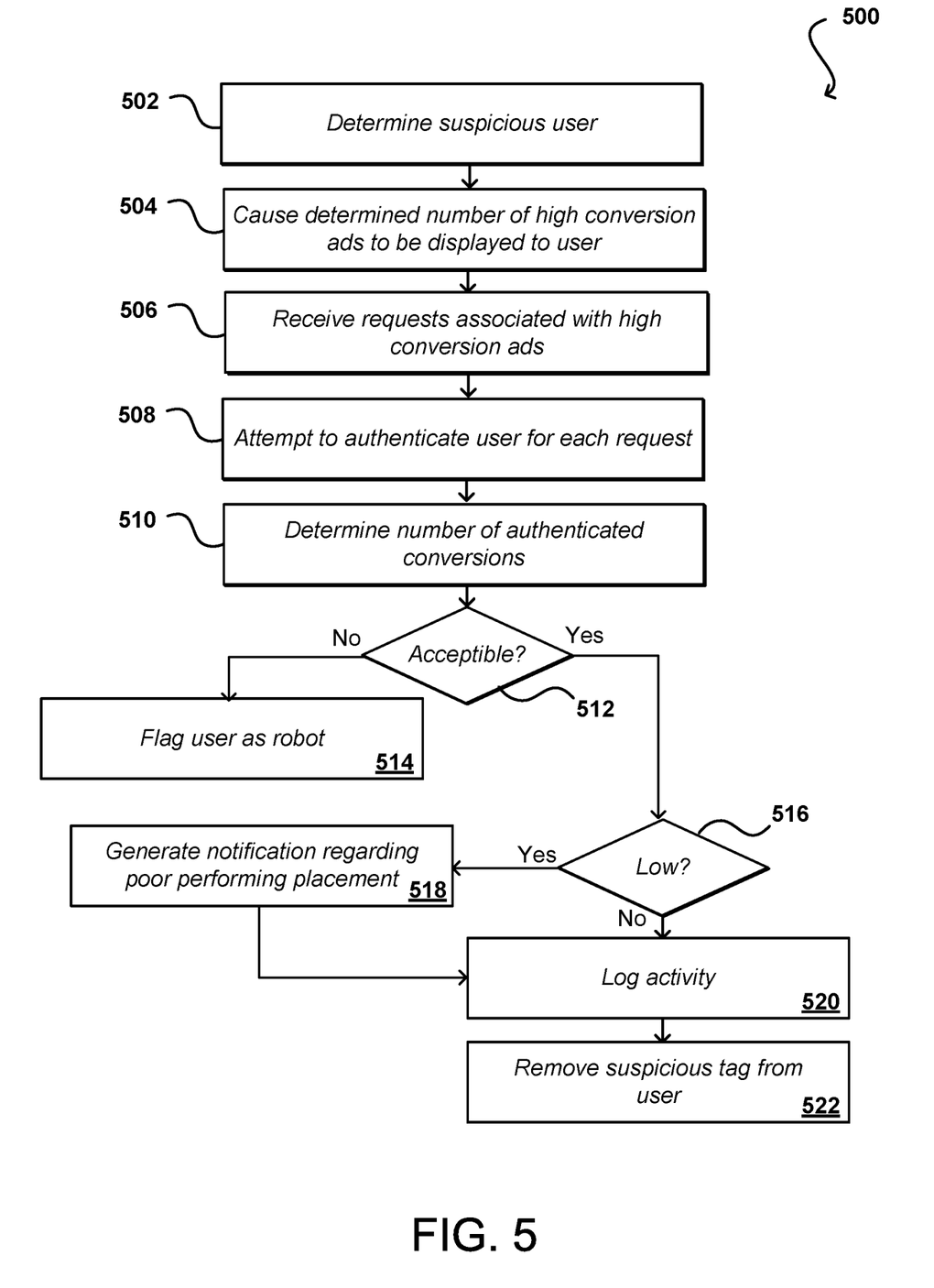
FIG. 5 illustrates an example process for determining user activity with respect to high conversion content that can be utilized in accordance with various embodiments.

FIG. 5 illustrates an example process 500 that can be utilized in such an environment in accordance with various embodiments. It should be understood that, for this and other processes discussed herein, there can be additional, fewer, or alternative steps, performed in similar or alternative steps, or in parallel, within the scope of the various embodiments unless otherwise stated. In this example, a component such as the activity manager 408 of FIG. 4 can determine 502 a suspicious user. As mentioned, this can involve monitoring a conversion rate of the user or detecting that the conversion rate for a user, at least over a recent period of time, falls outside an acceptable conversion range. In some embodiments, a potentially suspicious user can also be identified when the user has too few data points to make an accurate determination. For example, if the user has only three data points and one is a conversion, that might fall within the acceptable conversion rate range. It is impossible to know, based on the number of data points, whether that user's conversion rate based on one conversion is 30%, 1% 0.01%, etc. Thus, in some embodiments users with very few data points can be selected for obtaining further data, particularly where a group of such users are accessing similar sites, applications, or content. For content served to that user, a determined number of high conversion ads can be caused 504 to be displayed to the user, or at least included with content that is displayable to the user. In some embodiments this includes sending information for the high conversion ads until a determined and/or minimum number of impressions is detected. As mentioned, the appropriate number of impressions can depend on factors such as the expected conversion rate, actual conversion rate, expected conversion rate for the ad, and other such information. In response to providing the high conversion ad, requests associated with that ad will be received 506. If no requests or clicks were detected, the user could simply be flagged as a robot and the process ended.

For each request in this example an attempt is made 508 to authenticate the user, such as by using an authentication manager or other such component or service as discussed previously. In some embodiments a third party authentication service might be used for such purposes. A number of authenticated conversions can be determined 510 for the number of impressions of the high conversion ad that were served to, and potentially viewed by, the user. If the number (or rate) of conversions is not acceptable 512, such as where the rate falls below a minimum conversion rate threshold, the user can be flagged 514 as a robot or otherwise handled as likely not being a human user. Other remedial actions can be taken as well, such as to block or delete the user or user account. If a human subsequently indicates that they were improperly blocked, the account can be reactivated or unblocked and the user account whitelisted or otherwise flagged as a valid human user. If the conversion rate is successful but the rate is determined 516 to be on the low side, the placement(s) of the ad can be analyzed to determine which of the placements is performing poorly, or at least below expectations. In this example a notification of the poor performing placement can be generated 518 to be provided to, or viewable by, an entity associated with the placement, such that a content provider or other such entity can make changes to improve the placement or otherwise adapt the ads or content displayed in that location or placement. Regardless of whether the rate is low, the activity can be logged 520 or otherwise stored for subsequent analysis. Further, the suspicious tag (or other indicator) can be removed 522 from the user account, or a flag added that the user is a valid human user, among other such options.

As mentioned, some of the suspicious users will be associated with a common publisher who is attempting to inflate his or her ad revenue. If users with common patterns of behavior for the same sites are detected, a small number of those users can be tested and if those users are found to be robots then the entire group of similar users can be flagged as robots and the publisher account closed or otherwise handled for violating the rules of the advertising program, etc. In some embodiments it will be tough to correlate the users based on the lack of data points or other such information. In such instances it can be beneficial to instead look at the collective behavior of sites associated with a publisher to attempt to identify publishers with a lot of robotic traffic generating impressions, clicks, and/or conversions.

In some embodiments, each publisher can have a score generated that is an indication of advertising performance for sites associated with that publisher. A high score can indicate that ads placed on those sites have high numbers of impressions and high conversion rates, while a low score may indicate that the ads have poor placement, are not sufficiently related to the content, or otherwise are not performing as expected. For most of these publishers, however, the conversion rates and other ad metrics will still fall within the appropriate range. For some publishers the conversion rates may fall way under the expected levels with sufficient amounts of data that the publisher can be determined to be using robot traffic and can be blocked, have the content deleted, or can otherwise be handled by the advertising entity. For other publishers, it may be necessary to attempt to determine if that publisher has a high percentage of robot traffic leading to the poor performance and thus poor publisher scores.

Figure 6:
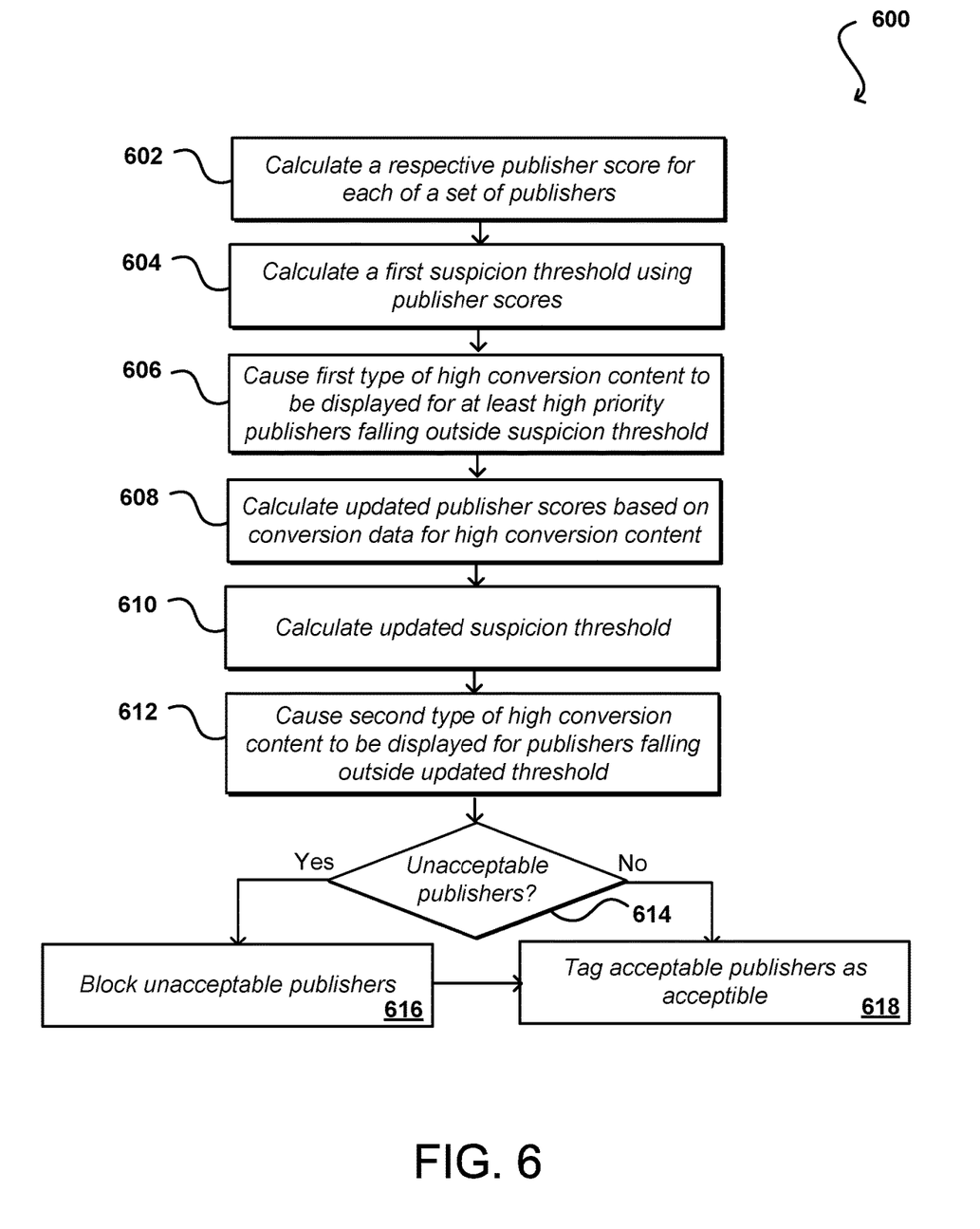
FIG. 6 illustrates an example process for determining where to provide high conversion content for tracking user activity that can be utilized in accordance with various embodiments.

FIG. 6 illustrates an example process 600 that can be used to attempt to identify publishers that are using robots to improperly increase their ad revenue, or other such compensation, that can be utilized in accordance with various embodiments. In this example, a respective publisher score can be calculated 602 for each publisher (or at least a subset of publishers) associated with an advertising entity. As mentioned, the score can be based upon factors such as number of ad impressions, number of data points, number or percentage of suspicious users, click through rate, conversion rate, and other such factors. In some embodiments the score can be a weighted combination of any or all of these factors. Because the performance of the publishers can vary, and because using high conversion rate content can be expensive, it can be desirable in at least some embodiments to not use a fixed selection threshold as that can sometimes result in a large number of publishers being selected, which can potentially be very expensive for the advertiser. Accordingly, the range and values of the publisher scores can be analyzed, and in some cases some of the publishers prioritized based on their scores, historical performance, or other such metric, in order to calculate 604 an appropriate conversion (or "suspicion") threshold that will cause at most a determined number of publishers to be selected for testing, in order to control costs for the testing. For example, the threshold can be set at a value that can cause at most ten of the publishers to be selected. There might be a target conversion rate that more than ten might fall below, but the threshold might be set so that only the ten worst offenders are tested. If a number of publishers falling below the target conversion rate range is below the number of publishers that can be tested for a determined cost, then the threshold might be set to the bottom of the range. Various other values can be set as well within the scope of the various embodiments.

For the publishers selected for testing, a first type of conversion content can be displayed 606 on sites, applications, or other content provided by, or otherwise associated with, that provider. In some embodiments only a single type of high conversion content might be used, but in this example since an initial group of publishers is selected for testing that might be relatively large, it can be desirable to select a first type of high conversion rate content that might cost less but provide sufficient conversion information to validate that at least some of the publishers have valid human-generated traffic. For example, instead of a $5 gift card an ad might advertise a free music download or other compensation that is significantly less than $5, but still provides a relatively high conversion rate such that a number of valid human requests should be received for those ads. As mentioned previously, the value of the ads or the number of ads served can vary based on factors such as budget, number of potential abusers, and the like.

Based at least in part upon the conversion data that is received for the high conversion content, including the number of human user validations, updated publisher scores can be calculated 608 for at least the selected publishers. A similar process can be used as before to calculate 610 a new or updated suspicion threshold, and cause 612 a second type of high conversion content to be displayed with content associated with publishers falling below the updated threshold. If none of the publishers fall below the new threshold, then no publishers may be blocked at this time and the process can continue. As mentioned, the second type of content can have a much higher value and average conversion rate in order to attempt to obtain more accurate data and evidence as to the number of non-human users of the publisher's content. The conversion data will again be determined for the high conversion rate content, and a determination made 614 as to whether any of the publishers have conversion rates that are unacceptable or otherwise fall below the threshold or a minimum acceptable rate. If so, those publishers with unacceptably low rates can be blocked 616 or otherwise handled. For publishers with acceptable rates, those publishes can be tagged 618 as acceptable or otherwise flagged or managed such that those publishers are not selected for testing again in order to minimize testing costs, unless the behavior of those publishers is such that repeated testing is warranted.

In addition to saving the advertiser money, approaches in accordance with the various embodiments can help to improve the performance of a content serving system, an advertising system, and various client devices and computers running related applications, among other such systems, services, and devices. As mentioned, there can be a large number of robotic users which can provide a significant drain on resources such as bandwidth, processing capacity, and memory. By reducing this fraudulent traffic, the performance of these systems can be improved. The improvement can include faster download speeds, reduced latency in advertisement and other content interaction, more reliable content, and other such aspects. Further, the reduction in traffic can allow for fewer resources to be required, which can require less management and oversight within the system, as well as less repair and potentially less downtime.

Figure 7:
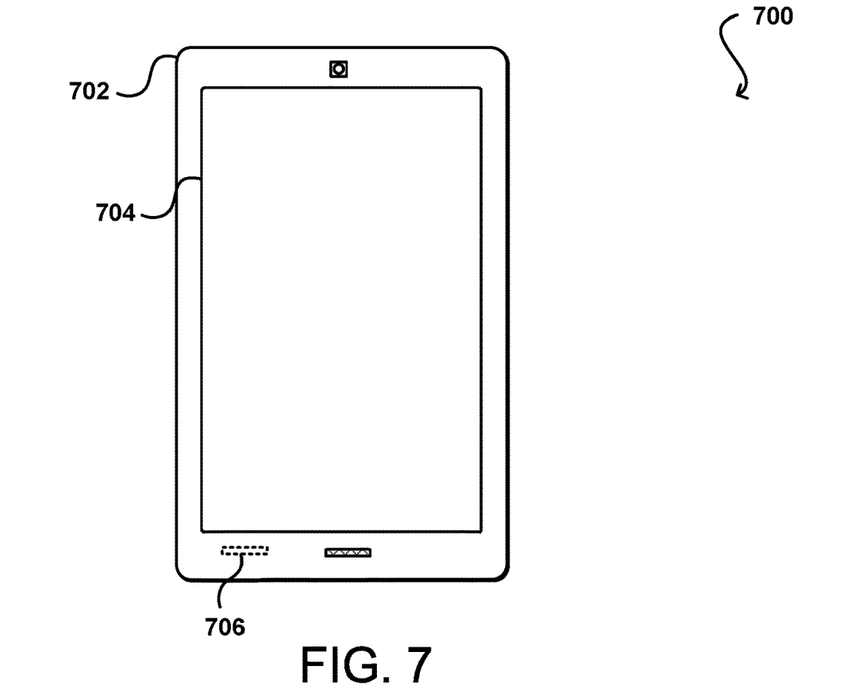
FIG. 7 illustrates an example computing device that can be utilized in accordance with various embodiments.

FIG. 7 illustrates an example computing device 700 that can be used in accordance with various embodiments. Although a portable computing device (e.g., a smart phone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, wearable computers (e.g., smart watches or glasses), television set top boxes, and portable media players, among others.

In this example, the computing device 700 has a display screen 704 and an outer casing 702. The display screen under normal operation will display information to a user (or viewer) facing the display screen (e.g., on the same side of the computing device as the display screen). As discussed herein, the device can include one or more communication components 706, such as may include a cellular communications subsystem, Wi-Fi communications subsystem, BLUETOOTH® communication subsystem, and the like.

Figure 8:
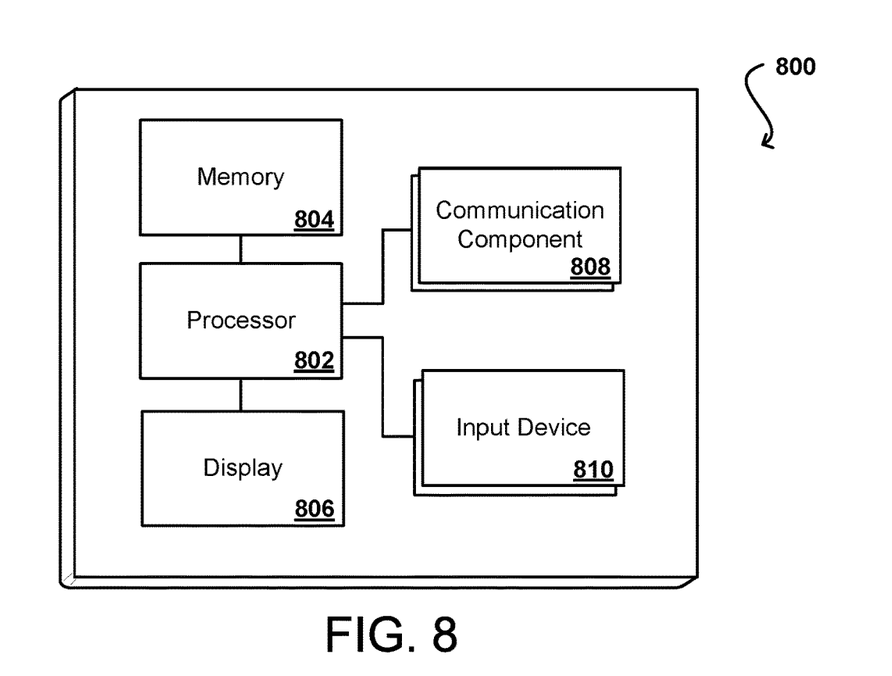
FIG. 8 illustrates an example configuration of components of a computing device, such as the device illustrated in FIG. 7.

FIG. 8 illustrates a set of basic components of a computing device 800 such as the device 700 described with respect to FIG. 7. In this example, the device includes at least one processor 802 for executing instructions that can be stored in a memory device or element 804. As would be apparent to one of ordinary skill in the art, the device can include many types of memory, data storage or computer-readable media, such as a first data storage for program instructions for execution by the at least one processor 802, the same or separate storage can be used for images or data, a removable memory can be available for sharing information with other devices, and any number of communication approaches can be available for sharing with other devices. The device typically will include at least one type of display element 806, such as a touch screen, electronic ink (e-ink), organic light emitting diode (OLED) or liquid crystal display (LCD), although devices such as portable media players might convey information via other means, such as through audio speakers. The device can include at least one communication component 808, as may enabled wired and/or wireless communication of voice and/or data signals, for example, over a network such as the Internet, a cellular network, a Wi-Fi network, BLUETOOTH®, and the like. The device can include at least one additional input device 810 able to receive conventional input from a user. This conventional input can include, for example, a push button, touch pad, touch screen, wheel, joystick, keyboard, mouse, trackball, camera, microphone, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

Example environments discussed herein for implementing aspects in accordance with various embodiments are primarily Web-based, as relate to Web services and cloud computing, but it should be appreciated that, although a Web-based environment is used for purposes of explanation, different environments may be used, as appropriate, to implement various embodiments. Client devices used to interact with various embodiments can include any appropriate device operable to send and receive requests, messages, or information over an appropriate network and convey information back to a user of the device. Examples of such client devices include personal computers, smart phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof.

Various aspects can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C # or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and other non-transitory computer readable media for containing code, or portions of code, can include any appropriate media known or used in the art, including storage media and communication media, such as but not limited to volatile and non-volatile, removable and non-removable media implemented in any method or technology for storage of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A system, comprising:
at least one processor; and
memory storing instructions that, when executed by the at least one processor, cause the system to:
determine that a first conversion rate for convertible content provided concurrently with primary content fails to meet a range of conversion rate thresholds that is associated with human user activity;
provide instances of the convertible content in response to user requests for the primary content;
present user account login processes for individual instances of the convertible content in order to validate unique user accounts associated with individual ones of the user requests;
determine a second conversion rate associated with successful validation for the user account login processes; and
restrict access to one of a user or a publisher associated with the primary content in response to the second conversion rate not satisfying a threshold, or
provide access to the one of the user or the publisher associated with the primary content in response to the second conversion rate satisfying the threshold.

2. The system of claim 1, wherein the instructions when executed by the at least one processor further cause the system to:
restrict traffic received for the primary content in response to the second conversion rate being not satisfying the threshold.

3. The system of claim 1, wherein the instructions when executed by the at least one processor further cause the system to:
remove restrictions to the user or the publisher when a request from the user or the publisher is confirmed as being associated with a valid human user.

4. The system of claim 1, wherein the instructions when executed by the at least one processor further cause the system to:
determine that the second conversion rate is higher than the threshold; and
provide a notification requiring an improvement in placements associated with the instances of the convertible content.

5. A computer-implemented method, comprising:
under the control of one or more computer systems configured with executable instructions,
determining that a first conversion rate for convertible content provided concurrently with primary content fails to meet a range of conversion rate thresholds that is associated with human user activity;
providing instances of the convertible content in response to user requests for the primary content;
presenting user account login processes for individual instances of the convertible content in order to validate unique user accounts associated with individual ones of the user requests;
determining a second conversion rate associated with successful validation for the user account login processes; and
restricting access to one of a user or a publisher associated with the primary content in response to the second conversion rate not satisfying a threshold, or
providing access to the one of the user or the publisher associated with the primary content in response to the second conversion rate satisfying the threshold.

6. The computer-implemented method of claim 5, further comprising:
restricting traffic received for the primary content in response to the second conversion rate not satisfying the threshold.

7. The computer-implemented method of claim 5, further comprising:
removing restrictions to the user or the publisher when a request from the user or the publisher is confirmed as being associated with a valid human user.

8. The computer-implemented method of claim 5, further comprising:
determining that the second conversion rate is higher than the threshold; and
providing a notification requiring an improvement in placements associated with the instances of the convertible content.

9. The computer-implemented method of claim 8, further comprising:
improving the placements associated with the instances of the convertible content.

10. The computer-implemented method of claim 5, further comprising:
flagging a suspicious user associated with the user requests as an automated process in response to no valid human user determinations being made for the suspicious user, over a minimum number of displays of the instances of the convertible content to the suspicious user.

11. The computer-implemented method of claim 10, further comprising:
restricting a request for the primary content received from the automated process.

12. The computer-implemented method of claim 5, further comprising:
determining as high conversion rate content those instances of the convertible content that satisfy a predetermined conversion rate threshold in the range of conversion rate threshold;
causing a determined number of instances of high conversion rate content to be included concurrently with the primary content in response to the user requests received for the primary content, wherein the high conversion rate content is associated with a high conversion rate among human users; and
selecting the instances of the high conversion rate content based at least in part upon an anticipated number of the user requests for the primary content to be received over a determined period of time.

13. The computer-implemented method of claim 12, wherein an individual instance of the high conversion rate content provides an offer of compensation to a user selecting the high conversion rate content and being validated as a human user.

14. The computer-implemented method of claim 12, wherein the instances of high conversion rate content include two or more types of compensation.

15. The computer-implemented method of claim 12, further comprising:

causing the instances of high conversion rate content to be presented across at least one of a plurality of websites or a plurality of applications.

16. A non-transitory computer readable storage medium storing instructions for managing a process, the instructions, upon being executed by at least one processor, causing the at least one processor to:

determine that a first conversion rate for convertible content provided concurrently with primary content fails to meet a range of conversion rate thresholds that is associated with human user activity;

provide instances of the convertible content in response to user requests for the primary content;

present user account login processes for individual instances of the convertible content in order to validate unique user accounts associated with individual ones of the user requests;

determine a second conversion rate associated with successful validation for the user account login processes; and restrict access to one of a user or a publisher associated with the primary content in response to the second conversion rate not satisfying a threshold, or provide access to the one of the user or the publisher associated with the primary content in response to the second conversion rate satisfying the threshold.

17. The non-transitory computer readable storage medium of claim 16, wherein the instructions upon being executed by the at least one processor, further causing the at least one process to:

disregard traffic received for the primary content in response to the second conversion rate being lesser than the threshold.

18. The non-transitory computer readable storage medium of claim 16, wherein the instructions upon being executed by the at least one processor, further causing the at least one process to:

remove restrictions to the user or the publisher when a request from the user or the publisher is confirmed as being associated with a valid human user.

19. The non-transitory computer readable storage medium of claim 16, wherein the instructions upon being executed by the at least one processor, further causing the at least one process to:

determine that the second conversion rate is higher than the threshold; and provide a notification requiring an improvement in placements associated with the instances of the convertible content.

20. The non-transitory computer readable storage medium of claim 19, wherein the instructions upon being executed by the at least one processor, further causing the at least one process to:

improving the placements associated with the instances of the convertible content.

* * * * *